Figure 1:
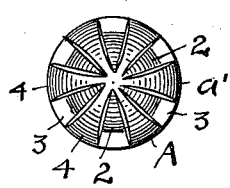

No. 662,134. Patented Nov. 20, 1900.
F. W. RODD.
SCREW.
(Application filed Feb. 9, 1900.)
(No Model.)

ATTEST.
W. B. Moser
H. E. Mudra

INVENTOR.
Fredrick W. Rodd
BY W. T. Fisher ATTY

UNITED STATES PATENT OFFICE.

FREDRICK W. RODD, OF CLEVELAND, OHIO, ASSIGNOR OF ONE-HALF TO DAVID A. MALLO, OF SAME PLACE.

SCREW.

SPECIFICATION forming part of Letters Patent No. 662,134, dated November 20, 1900.

Application filed February 9, 1900. Serial No. 4,592. (No model.)

*To all whom it may concern:*

Be it known that I, FREDRICK W. RODD, a citizen of the United States, residing at Cleveland, in the county of Cuyahoga and State of Ohio, have invented certain new and useful Improvements in Screws; and I do declare that the following is a full, clear, and exact description of the invention, which will enable others skilled in the art to which it appertains to make and use the same.

My invention has reference to improvements in screws, and more particularly to the smaller sizes of screws, which generally have heads adapted to be engaged by ordinary screw-drivers to force them to place. Specifically, the invention lies in the head of the screw, or the screw formed with a novel style and construction of head whereby well-known objections to the transversely-slotted head, heretofore almost universally and exclusively used, are overcome or avoided and a very materially improved article is produced.

In the common old-fashioned countersunk or under-beveled screw-head with a flat face and a central slot or channel across said face for the screw-driver, as well as in heads not countersunk, but flat and channeled on top, as the others, there are objections both in its manufacture and its use which are desirable to be overcome. Thus in the manufacture the head is first made complete without the slot or channel, and this has to be cut afterward and requires a separate special operation, thus adding correspondingly to the cost of production. Then, as regards the use of the screw when made, it is well known that there are many places where such a screw is really not fit to be used at all—notably, in all hard-wood constructions. Take, for example, the manufacture of hard-wood furniture, and chairs especially, in which screws are extensively used for securing the arms and other parts. The screw must be allowed to make its strongest possible engagement or it will not endure the heavy wear and tear that comes upon it, and hence its head is put under such severe strain in driving it to its place that a large percentage of screws have their heads laterally split or disrupted before reaching their seats and have to be removed and replaced by others. This difficulty is well known to occur in all hard-wood work as well as in other uses, so that a mutilated screw-head is a very common thing in the observation of every one.

My present invention is therefore designed to remedy these defects in screws, especially of the kind which are not countersunk and which enter extensively into the manufacture of stoves and other metal manufactures, as well as into hard-wood uses in a great variety of relations and places. The invention therefore consists in a screw with a head constructed about its side with flutes or their equivalent to form shoulders for engaging the instrument or tool wherewith the screw is to be driven to its seat and removed, all substantially as shown and described, and particularly pointed out in the claims.

Figure 3:
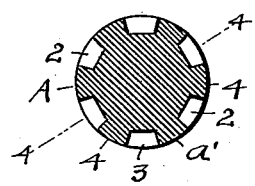
Figure 2:
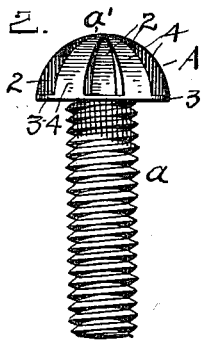
Figure 4:
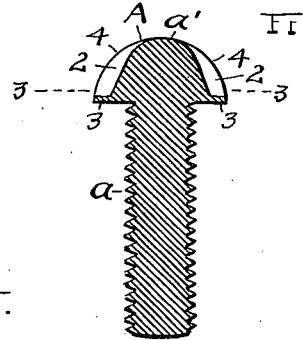
Figure 5:
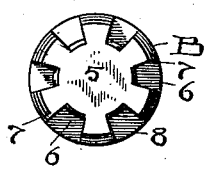
Figure 6:
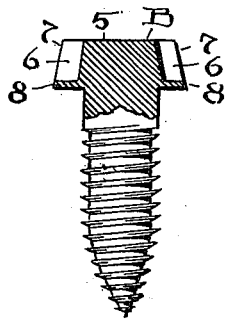

In the accompanying drawings, Figure 1 is a plan view, and Fig. 2 is a plain elevation, of one form of screw-head embodying my invention. Fig. 3 is a cross-section of the head on a line corresponding to 3 3, Fig. 4, and Fig. 4 is a central sectional elevation of the screw shown in Fig. 2. Fig. 5 is a plan view, and Fig. 6 is a longitudinal sectional elevation, of a modified form of head. Either form of stem or threaded portion shown in these views may be used with either style of head, according to the use to which the screw is to be put.

In said views, A represents one form of my new construction of screws which has the usual threaded stem *a* and a head *a'* of a substantially semispherical shape in external outline. The head having this outline is formed with a series of flutes or channels 2, running from the base of the head into the top, where they may run out, as here shown, or across into the next opposite channel. These channels therefore lie parallel to the axis of the screw on the side of the head and practically lengthwise therewith and are both deepest and widest at their lower portions where they start from the comparatively thin web 3, which spans the bottom of the flute. They also are as nearly square along their edges as is practicable to make in a die, so as to form engaging shoulders for the turning instrument. Now in the manufacture this screw has the advantage of making the flutes complete in a single operation in dies constructed for this purpose. They therefore require no after-work to cut the flutes or channels, as in the old-fashioned screw, and afford a head on which there are so many lines of engagement distributed over such a large surface and with such obvious advantage in their location that the head can neither be mutilated nor even disfigured by a suitable tool to turn it to place. Of course an ordinary screw-driver will not avail with this style of screw, and it is not intended that it should, and hence also a special tool is required for this purpose. However, this at last operates both for economy and utility, because all screws are perfectly preserved in this way, and the tool itself, which comes like a cap over the head, serves as a protection instead of being a fruitful means for its injury, as with the old screw-driver. By having the web 3 at the bottom a perfectly smooth surface is afforded at the bottom of the head, and the walls 4 form strong engagements for the tool.

In Figs. 5 and 6 I show a modified form of screw B, having a head b of conoidal shape. The top 5 is flat and plain, while the flutes or channels 6 may correspond to those in Figs. 1 to 4, both in size and distribution, or they may differ in these particulars. Here, again, the total length of engagement of the tool on the head is very considerable, being equal to the sum of the lengths of all the flutes from end to end, as in the other form, and the land between the flutes in which are the engaging shoulders 7 for the turning-tool is such as to withstand all possible strain upon it, even to the twisting of the stem of the screw. In this case also there is a web 8 at the bottom of the channels 6, making the head smooth below. Altogether, therefore, the invention affords a head which is obviously attractive and ornamental and can be used as a feature of decoration, while it materially economizes manufacture and has exceptional utility in all places where a screw of this kind is available. In striking up the head in dies the metal displaced by the flutes is thrown into the land or ribs between them, so that in a sense both flute and land are made together. Therefore it is immaterial how the operation is viewed, since the result is the same, and the shoulders or ribs between the flutes are the features of practical value; but flutes or depressions are necessary or there can be no shoulders or ribs. Hence in the construction of the word "flute" as used herein I mean the space between the shoulders or ribs, whether said shoulders or ribs be farther apart or nearer together than here shown.

What I claim is—

1. A screw having a head with a flat bottom and circular in cross-section and provided with a series of shoulders extending from the base of the head upward and deepest and widest nearest the base, substantially as described.

2. A screw having a head circular in cross-section from top to base and provided with a series of flutes at regular intervals from the top of the head downward substantially parallel to its axis and a web across the bottom of each flute and constituting a part of the otherwise flat bottom of the head, substantially as described.

Witness my hand to the foregoing specification this 31st day of January, 1900.

FREDRICK W. RODD.

Witnesses:
H. E. MUDRA,
R. B. MOSER.